United States Patent

[11] 3,587,761

| [72] | Inventors | Layton C. Merriam<br>Mendon;<br>Austin L. Davis, Brandon, Vt. |
|---|---|---|
| [21] | Appl. No. | 806,176 |
| [22] | Filed | Mar. 11, 1969 |
| [45] | Patented | June 28, 1971 |
| [73] | Assignee | Howe Richardson Scale Company<br>Rutland, Vt. |

[54] LOAD CELL FORCE TRANSMITTING ASSEMBLY FOR VEHICLE WEIGHING SCALES AND THE LIKE
7 Claims, 7 Drawing Figs.

[52] U.S. Cl. .................................................. 177/134,
177/211, 177/255, 73/141
[51] Int. Cl. .................................................. G01g 3/14,
G01g 19/02, G01g 21/24
[50] Field of Search .......................................... 73/141, 141
(A); 177/208, 209, 211, 255, 141, 134, 136

[56] References Cited
UNITED STATES PATENTS

| 2,319,299 | 5/1943 | Converse | 73/141(A) |
| 2,786,669 | 3/1957 | Safford et al. | 177/211 |
| 2,995,034 | 8/1961 | Bolten | 73/141(A) |
| 3,153,974 | 10/1964 | Canning | 73/141(A) |
| 3,178,937 | 4/1965 | Bradley | 73/141 |
| 3,284,749 | 11/1966 | Fouretier | 73/141(A) |
| 3,321,035 | 5/1967 | Tarpley | 177/255X |

FOREIGN PATENTS

| 877,101 | 9/1961 | Great Britain | 73/141(A) |
| 959,352 | 6/1964 | Great Britain | 73/141(A) |
| 1,068,480 | 5/1967 | Great Britain | 177/211 |

*Primary Examiner*—Robert S. Ward, Jr.
*Attorney*—Norris & Bateman

ABSTRACT: An assembly for supporting a load-receiving structure and transmitting the weight of a load applied thereto to a load cell. The assembly has an impact-absorbing resilient pad on which a layer of antifriction material is disposed to provide a surface which slidably supports the load-receiving structure for horizontal movement. The pad is fixed on the central portion of a flexure plate or diaphragm having only its opposite end regions so anchored to a stationary surface that the intermediate portions of the plate between each end region and the central region are flexed by the load transmitted to the pad. The central plate portion is thus vertically displaceable to engage and transmit loads to the load cell stress column located vertically below the central portion. This flexure of the plate and the horizontal platform movement provides for the transmission of only those forces which substantially axially align with the load cell column. Cover plates on opposite sides of the force transmitting assembly cooperates with the flexure plate and stands on which the flexure plate end regions are anchored to provide an enclosure for the load cell.

PATENTED JUN28 1971

INVENTORS
LAYTON C. MERRIAM
AUSTIN L. DAVIS

BY Norris & Bateman

ATTORNEYS

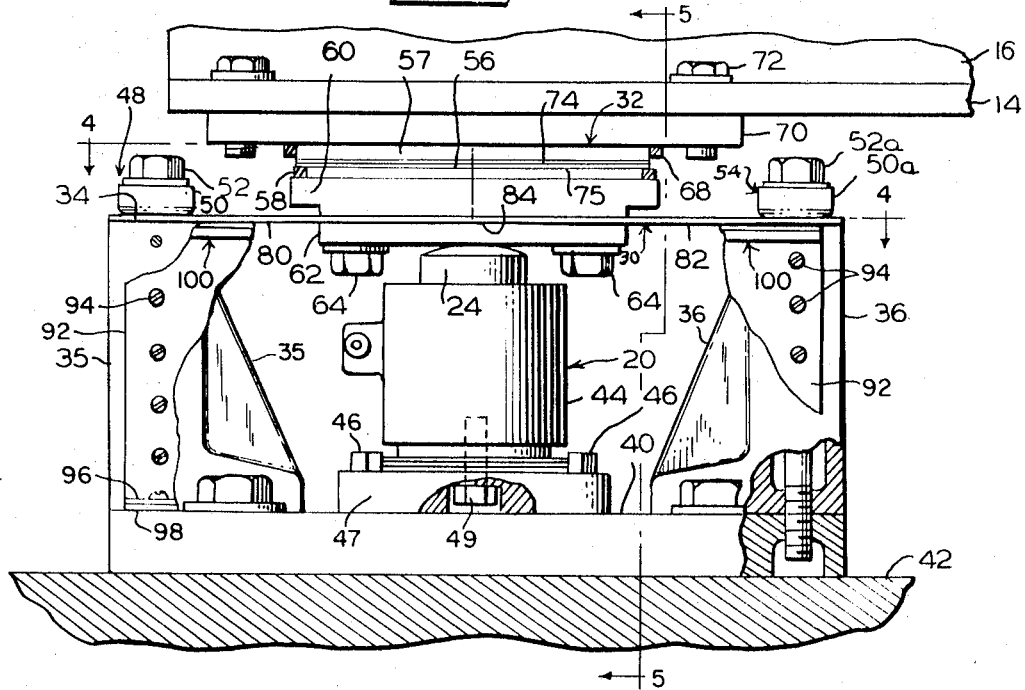
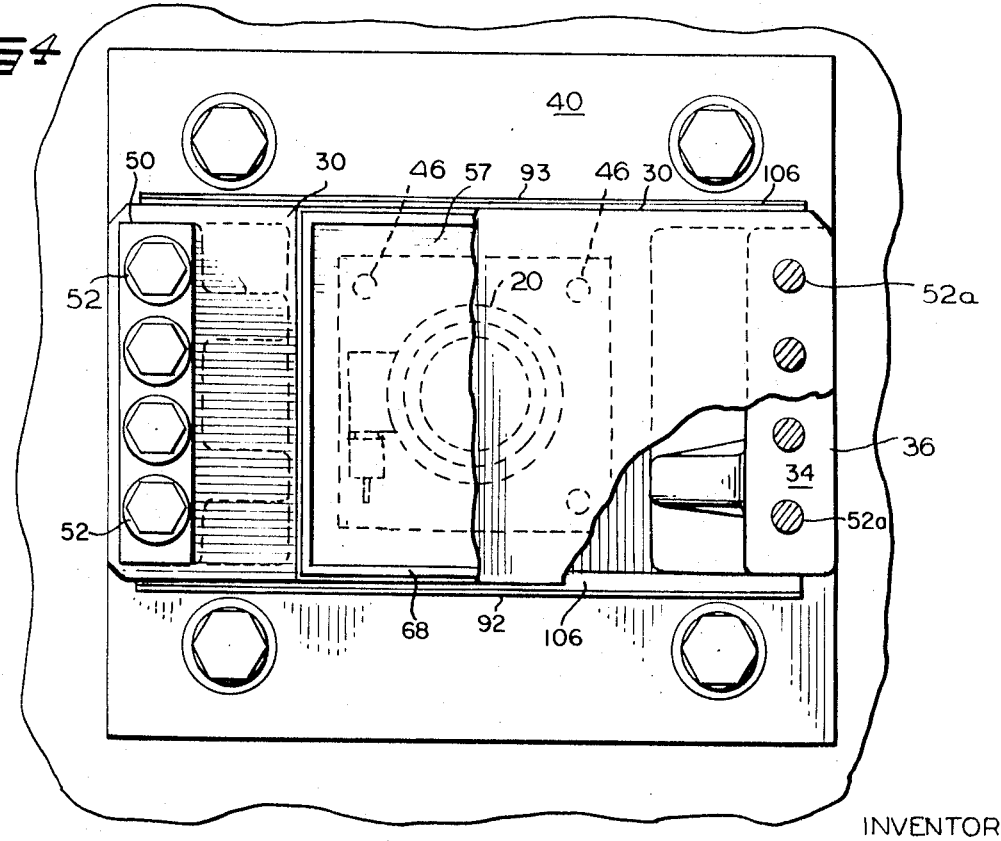

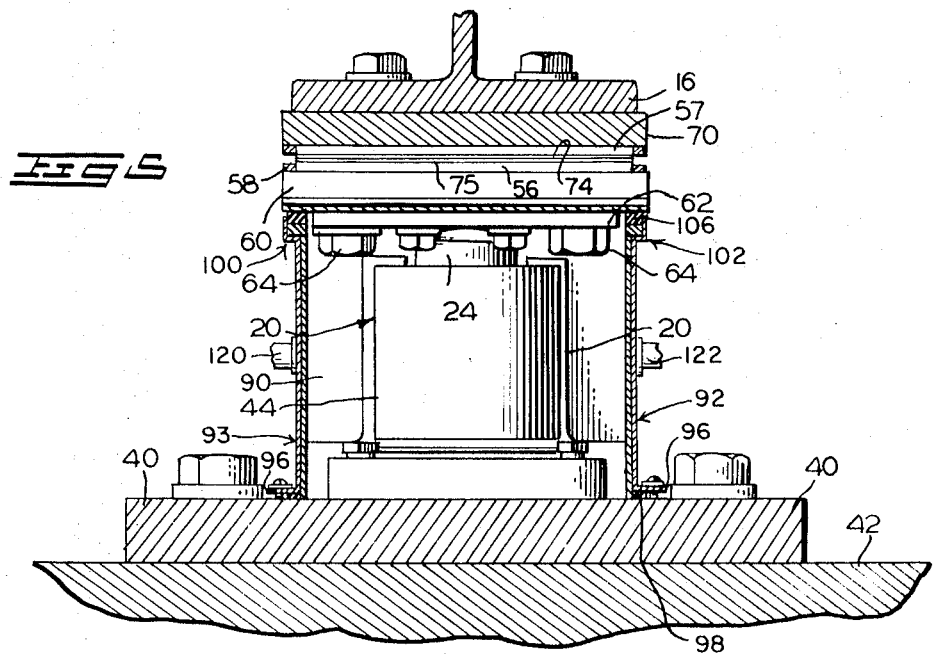
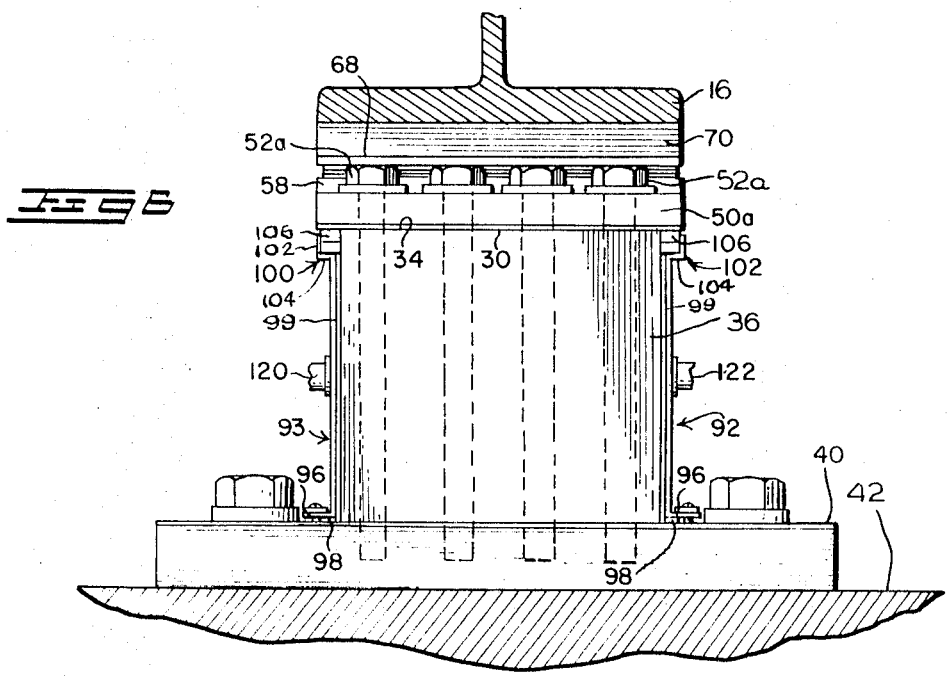
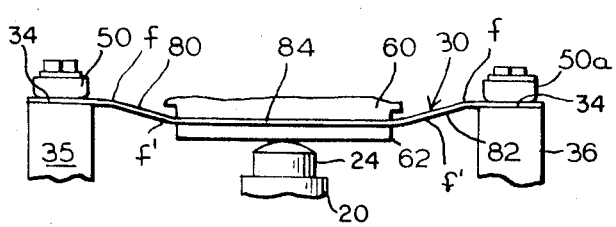
INVENTORS
LAYTON C. MERRIAM
AUSTIN L. DAVIS
Norris & Bateman
ATTORNEYS

LOAD CELL FORCE TRANSMITTING ASSEMBLY FOR VEHICLE WEIGHING SCALES AND THE LIKE

FIELD OF INVENTION

This invention relates to assemblies for transmitting forces to a load cell and is particularly concerned with vehicle scales which are supported by load cell corner assemblies.

BACKGROUND OF INVENTION

In the past it has been the custom to support a vehicle scale weighbridge on load cells which are usually located at the corners of the weighbridge. With such an arrangement it was found that nonaxial or horizontal force components were developed and applied to the load cells. Such horizontal force components are caused by a number of factors such as the application of rolling loads to the weighbridge, the expansion and contraction of the weighbridge due to temperature variations, and deflection of structural beams or girders forming the platform supporting framework of the weighbridge. Nonaxial force components are objectionable because they impair the accuracy of the scale and may damage the load cells.

Some proposals have been made to eliminate some of the causes of horizontal force components, but they have mainly resulted in significantly increased costs of manufacture.

SUMMARY AND OBJECTS OF INVENTION

The present invention provides a simplified force-transmitting assembly for supporting the weighbridge and for transmitting substantially only vertically oriented force components to the load cell. This is accomplished by providing for each load cell a resilient pad having an antifriction surface which slidably supports the weighbridge for horizontal movement under the influence of horizontal force components. The pad is fixed to the central portion of a flexure plate having only its end regions anchored to a stationary surface so that the intermediate plate portions between the central portion and the end regions are flexed by application of a load to the pad. This plate flexure and the horizontal weighbridge motion substantially prevents the application of horizontal or nonaxial force components to the load cell.

With the foregoing in mind it is an object of this invention to provide a novel load cell force transmitting assembly which substantially prevents the transmission of horizontal or nonaxial force components to the load cell.

Another object of this invention is to provide a novel vehicle scale of improved accuracy.

A further object of this invention is to provide a novel assembly which transmits loads from the weighbridge to the load cells and which is so constructed that increased deflection of the weighbridge structural members can be tolerated without impairing the accuracy of the scale or damaging the load cells.

The force-transmitting assembly of this invention is so constructed that it offers another significant advantage, namely the enclosure of the load cell by the simple inexpensive addition of a pair of side cover plate assemblies. The enclosure is defined on the top by the flexure plate, on the opposite sides by the cover plate assemblies, on the ends by stands to which the end regions of the flexure plate are anchored, and on the bottom by a baseplate which mounts the stands and the load cell.

Accordingly, another object of this invention is to provide a novel enclosure for a load cell. The enclosure may be fluid-tight and air purged to minimize corrosion and to keep the enclosed load cell-receiving space free of dust and other foreign matter that could interfere with the operation of the scale.

Further novel features, additional important objects, and other significant advantages of this invention will become more fully apparent from the appended claims and as the detailed description proceeds in connection with the drawings described below.

DESCRIPTION OF DRAWINGS

FIG. 3 is a side elevation of one of the load cell and force-transmitting assemblies shown in FIG. 1;

FIG. 4 is a section taken substantially along lines 4–4 of FIG. 3;

FIG. 5 is a section taken substantially along lines 5–5 of FIG. 3;

FIG. 6 is a right-hand end elevation of the assembly shown in FIG. 3; and

FIG. 7 is a fragmentary view of the construction shown in FIG. 3 and illustrating the positions occupied by the force-transmitting elements when a load is applied to the weighbridge of the scale.

In its preferred embodiment the invention herein will be described to be incorporated into a platform-weighing scale of the type which is particularly adapted to weigh vehicles such as, for example, motor vehicles and railway cars. It will be appreciated, however, that the principles of this invention may also be applied to other forms of scales where it is desired to prevent the transmittal of horizontal force components to load cells or similar weight-measuring devices.

Figure 1:
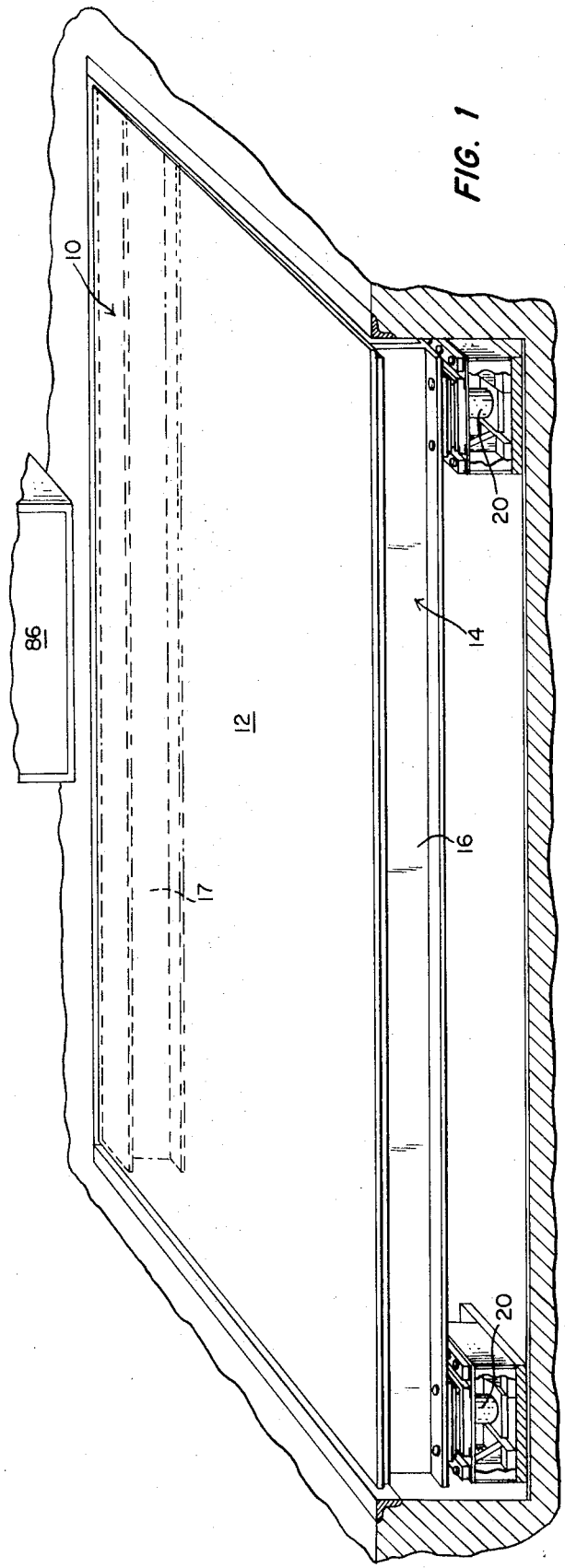
FIG. 1 is a fragmentary, partially schematic, perspective view of a vehicle scale incorporating the principles of this invention.

As shown in FIG. 1, the platform scale comprises a conventional weighbridge 10 which is suitably constructed for receiving motor vehicles. Weighbridge 10 includes a horizontal, flat, rectangular platform 12 which is mounted on a suitable structural framework 14. Framework 14 comprises a pair of parallel spaced-apart structural beams or girders 16 and 17 which may be of the WF-beam type. Beams 16 and 17 each extend from end to end of the platform and may be suitably joined together by structural stiffening members to provide an adequate frame for supporting loads applied to platform 12.

In prior platform scales, weighbridge 10 is supported directly on conventional load cells 20 (see FIG. 2) which may be located at the corners of platform 12. Each of the beams 16 and 17 thus seats on and spans the space between two of the load cells 20. Load cells 20 usually are of the strain gage-type having a cylindrical steel stress column 24 to which an unshown electrical resistance wire is bonded. Column 24 is often referred to as the spring element of the load cell.

Figure 2:
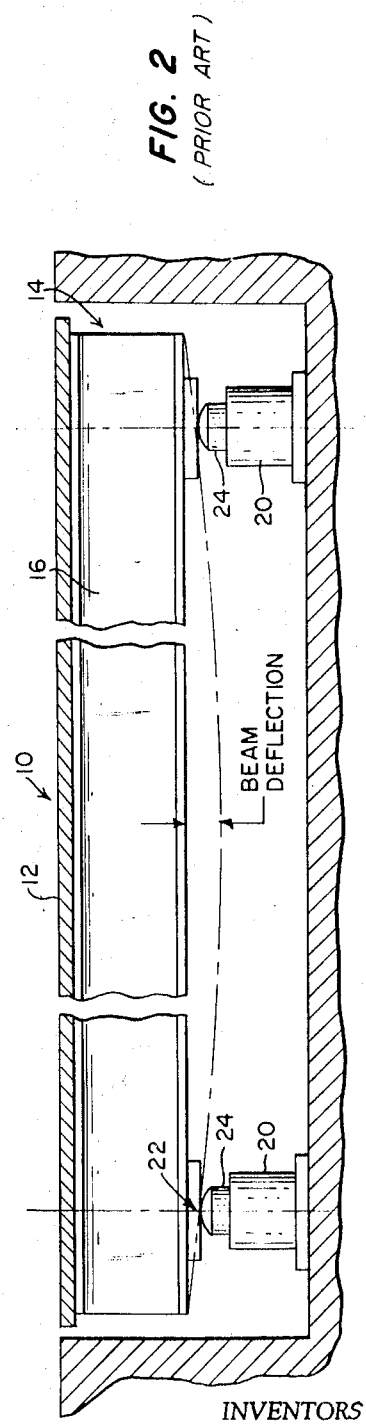
FIG. 2 is a partially section side elevation of a prior art vehicle scale.

When a load is applied to platform 12, the transmission of force to load cells 20 may not be vertical for the scale arrangement shown in FIG. 2. Such forces are indicated at 22 in FIG. 2 and are commonly referred to as off-vertical or parasitic loads. It is clear that off-vertical loads will not axially align with the load cell columns 24.

Off-vertical loads are objectionable because they result in an unpredetermined change in the force that load cells 20 sense and convert into an electrical signal. As a result, the accuracy of the scale is impaired because the load cell electrical output signal will deviate from a magnitude that is closely proportional to the weight of the load applied to weighbridge 10.

In addition to the foregoing, strain gage load cells can only withstand a limited side thrust. If such a limit is exceeded the stress column or member will permanently be deformed, thus requiring replacement of the cell.

Objectionable off-vertical loads may result from excessive deflection of each of the beams 16 and 17 as indicated in FIG. 2. In the past, beam deflection was minimized by utilizing stronger but more expensive, structural beams to make up the framework for weighbridge 10.

Off-vertical loads may also result from horizontal thrusts applied to weighbridge 10. Such horizontal thrusts may be the result of rolling loads (i.e., movement of the vehicle on platform 12), tipping of the scale, and/or temperature changes which induce expansion and contraction of weighbridge 10 relative to cells 20.

To prevent the transmission of off-vertical loads, the force-transmitting assembly of this invention includes a flat-sided rectangular flexure plate 30 (see FIG. 3) and a pad assembly 32 for transmitting the loads from weighbridge 10 to column 24 of each load cell 20. As shown in FIGS. 3 and 4, the opposite marginal edges of flexure plate 30 are seated on flat end faces 34 of a pair of spaced-apart rigid, metal stands 35 and 36 respectively.

Stands 35 and 36 are of identical L-shaped configuration and are suitably fixed to a flat-sided baseplate 40 in aligned, parallel, mirror image relation. Plate 40 is fixed on a flat, horizontal support surface indicated at 42. As shown, load cell 20, which has a cylindrical casing 44, is disposed equidistantly between stands 35 and 36 such that a longitudinal plane medially intersecting stands 35 and 36 passes diametrically through cell 20. Casing 44 is fixed to a mounting plate 47 by a machine screw 49, and plate 47 is fixed on baseplate 40 by suitable means such as machine screws indicated at 46. End faces 34 of stands 35 and 36 are contained in a common horizontal plane which perpendicularly intersects the longitudinal axis of column 24.

A clamping assembly 48 for anchoring the left-hand marginal edge of flexure plate 30 (as viewed from FIG. 3) on stand 35 comprises a flat-sided rectangular clamp plate 50 and a plurality of machine screws 52. The left-hand marginal edge of flexure plate 30 is tightly clamped between plate 50 and end face 34 of stand 35 by inserting screws 52 through aligned holes in plates 50 and 30 and by threading screws 52 into blind tapped holes which are formed in plate 40 along parallel axes that are normal to the plane containing end faces 34.

A second clamping assembly 54 anchoring the right-hand marginal edge of flexure plate 30 on stand 36 is of the same construction as assembly 48. Accordingly, like reference numerals suffixed by the letter a have been applied to designate the parts of assembly 54. As shown in FIG. 3, the right-hand marginal edge of flexure plate 30 is tightly clamped between plate 50a and end face 34 of stand 36 by inserting screws 52a through aligned holes in plates 50a and 30 and by threading screws 52a into blind tapped holes which are formed in plate 40 along parallel axes extending normal to the plane containing end faces 34.

Still referring to FIGS. 3 and 4, flexure plate 30 spans the space between end faces 34 and overlies load cell 20 in such a manner that a vertical plane medially intersecting plate 30 contains the longitudinal axis of column 24. The unanchored portion of plate 30 extending between end faces 34 is not secured to any stationary or support surface.

It will be appreciated that the clamped marginal edges of flexure plate 30, which seat on end faces 34, are retained in a common plane that normally intersects the longitudinal axis of column 24. When plate 30 is in its unflexed condition as shown in FIG. 3, the entire plate is in a plane normally intersecting the longitudinal axis of column 24.

As best shown in FIGS. 3 and 5, pad assembly 32 comprises a pair of flat-sided, rectangular pads 56 and 57 which are formed from a suitable, impact-absorbing resilient material such as rubber or an equivalent synthetic. Pad 56 is mounted in a rigid, rectangular frame 58 on the upwardly facing flat surface of a rigid, flat-sided clamping plate 60. Frame 58 is fixed to plate 60.

The central portion of flexure plate 30 overlying load cell 20 is tightly clamped between plate 60 and another plate 62 by a series of machine screws 64 which are inserted through aligned holes in plates 62 and 30 and which are threaded into parallel tapped holes which are formed in plate 60.

Pad 57 overlies pad 56 and is mounted in a rectangular frame 68 on the underside of flat-sided, rectangular mounting plate 70. Plate 70 is fixed to the bottom flange of beam 16 by any suitable means such as bolts or machine screws indicated at 72. Frame 68 is fixed to plate 70, and pad 57 is confined in frame 68.

As shown in FIG. 3, the opposing surfaces of pads 56 and 57 are respectively coated with layers of Teflon (polytetrafluoroethylene) 74 and 75. Instead of coating the opposed surfaces of pads 56 and 57, sheets of Teflon may be epoxied to pads 56 and 57.

All of the load cell force-transmitting assemblies supporting weighbridge 10 are of the same construction, and in each load cell assembly the Teflon layer 75 slidably seats on its opposed, associated Teflon layer 74 to allow lateral and longitudinal displacement of weighbridge 10. In effect, therefore, weighbridge 10 is slidably seated on the pads 56 of the force-transmitting assemblies for universal movement in a horizontal plane. Suitable unshown means are provided for limiting the horizontal sliding movement of weighbridge 10 on pads 56 in addition to biasing the weighbridge to a properly centered position on the force-transmitting assemblies.

It will be appreciated that other suitable antifriction materials may be used in place of Teflon.

As sown in FIG. 3, the entire area on which weighbridge 10 seats at the interface between pads 56 and 57 is covered by Teflon layers 74 and 75. The force resulting from applying a load to weighbridge 10 is thus transmitted only through pads 56 and 57 in each of the force-transmitting assemblies to each flexure plate 30.

The force transmitted to plate 30 is applied to plate 62 which separably seats on the rounded end of column 24 as best shown in FIG. 3. The portion of flexure plate 30 which is clamped between plates 60 and 62 is spaced equidistantly from the regions of plate 30 which are respectively clamped between plate 50 and end face 34 of stand 35 and between plate 50a and end face 34 of stand 36. The intermediate region or section of plate 30 extending longitudinally between the central portion that is clamped between plates 60 and 62 and the end portion that is clamped between end face 34 of stand 35 and plate 50 is indicated at 80 in FIG. 3. Section 80 is unclamped and unsupported so that it is free to be flexed by application of a load to weighbridge 10. Likewise, the intermediate region of section of plate 30 extending longitudinally between the central portion that is clamped between plates 60 and 62 and the end portion that is clamped between end face 34 of stand 35 and plate 50a is indicated at 82 in FIG. 3. Section 82 is also unclamped and unsupported so that it too is free to be flexed by the application of a load to the weighbridge.

From the foregoing it is seen that by applying a load to weighbridge 10 sections 80 and 82 are flexed in the exaggerated manner shown in FIG. 7 to allow the central section of plate 30, which is clamped between plates 60 and 62 and which is indicated at 84, to be displaced vertically downwardly under the influence of the weight of the load. Downward displacement of section 84 and, consequently, plate 62 compressed the surface of column 24 to compress the unshown resistance wire which is bonded to, but insulated from column 24. Compression of this wire, as is well known, decreases its electrical resistance in proportion to the applied weight. This change in resistance causes a corresponding voltage variation in an unshown conventional circuit to provide an electrical DC signal whose amplitude is closely proportional to the weight applied to the load cell. This signal is usually amplified and then fed to a suitable signal utilization device such as a scale indicator 86 (FIG. 1) where it is read out in pounds or other units of weight.

When, as a result of deflection of beam 16, for example, an off-vertical load or force is applied to the force-transmitting assembly, section 84 will be displaced vertically downwardly and will remain in a horizontal plane. Maintenance of section 84 in a horizontal plane or more specifically in a plane that normally intersects the longitudinal axis of column 24 is achieved by the previously described clamping arrangement (stands 35 and 36, and plates 50, 50a, 60 and 62) which enables each of the intermediate plate sections 80 and 82 to be flexed in two regions as indicated by the reference characters $f$ and $f'$ in FIG. 7. For each of the sections 82 and 84, flexure regions $f$ and $f'$ are oppositely curved and are joined together by a single point or region of inflexion.

Flexure regions $f$ and $f'$ for each of the sections 80 and 82 are straight, parallel, and extend from one longitudinal side edge of plate 30 to the other side edge thereof.

By maintaining flexure plate section 84 in a plane that normally intersects the longitudinal axis of column 24, only those forces which align with the longitudinal axis of column 24 will be transmitted by plate 30 for application to column 24. As beam 16 deflects, it slides slightly on the Teflon-coated pads 56 of the supporting force-transmitting assemblies. If beam 16 could not slide in this manner as it deflects, a horizontal force component would be developed and applied to section 84 to cause section 84 to tilt out of a plane normally intersecting the longitudinal axis of column 24. As a result, an undesired horizontal or nonaxial force component would be applied to column 24. The sliding motion afforded by seating pad 57 on pad 56 thus prevents section 84 from being tilted as beam 16 is deflected.

The combination of the Teflon-coated pads 56 and 57, of flexure 30, and of the previously described clamping arrangement for plate 30 thus provides for the transmittal of only substantially axial (i.e., axially aligning with column 24) forces to the load cell columns 24. As compared with the prior art arrangement shown in FIG. 2, a greater magnitude of beam deflection can be tolerated without transmitting undesired off-vertical loads to the load cells. As a result, lighter beams or girders may be used in the fabrication of weighbridge 10. The cost of making the bridge is therefore reduced significantly without impairing the accuracy of the scale or causing damage to the load cells.

The weighbridge sliding motion afforded by pads 56 and 57 in each of the weighbridge-supporting load cell assemblies also prevents other horizontal thrust producing factors from tilting flexure plate section 84 out of the plane that normally intersects each column 24 of the load cells. Such factors as previously mentioned may be due to rolling loads and/or thermal expansion or contraction of the weighbridge. In effect, horizontal thrusts are neutralized or shunted away from the load cells by the sliding motion of weighbridge 10 on pads 56, and flexure plate 84 consequently remains in a plane normally intersecting the longitudinal axis of each column 24 as sections 80 and 82 are flexed. The sliding motion afforded by seating engagement of pads 57 on pads 56 also prevent permanent deformation of the flexure plates by off-vertical forces.

For conventional strain gage load cells the maximum deflection or compression of the column is on the order of 0.005 inches. Flexure plate 30 is provided with such a thickness that will afford this maximum deflection and is not so stiff as to impair the sensitivity of the force-transmitting and load cell assembly.

It will be noted that the force-transmitting assembly of this invention does not form a part of the load cell itself. The force-transmitting assembly may therefore be utilized with a variety of different types of load cells.

The foregoing force transmitting construction comprising stands 35 and 36, flexure plate 30, and plates 50, 50a, 60 and 62 in addition to pads 56 and 57 offers an added significant, advantage in that it simplifies the construction of a fluidtight enclosure for load cell 20 as shown in FIGS. 3—6. The enclosure is generally indicated at 90 in FIG. 5 and comprises a pair of rectangular, side cover plates, 92 and 93. Plate 92, as viewed from FIGS. 5 and 6, extends along the right-hand side of the force-transmitting assembly, spans the space between stands 35 and 36 and is fixed by suitable screws 94 (FIG. 3) to the sides of stands 35 and 36 which are flat and in a common vertical plane. At its bottom edge, plate 92 terminates in a horizontally outwardly extending flange 96 that overlies baseplate 40. A suitable seating gasket 98 is advantageously compressed between flange 96 and baseplate 40. Gasket 98 may be extended at both ends to provide vertical legs 99 (FIG. 6) which are compressed between plate 92 and the opposing sidewall surfaces of stands 35 and 36. Additional screws may be used for securing flange 96 to baseplate 40.

As shown in FIG. 6, the upper edge of plate 93 is formed with flange portion 100 which is defined by an outwardly offset, upstanding marginal edge 102 which is joined to the main space-enclosing portion of plate 93 by a horizontally disposed ledge portion 104. Ledge portion 104 extends laterally outwardly to provide an upwardly facing shoulder surface on which a sealing gasket strip 106 is seated. Strip 106 is compressed between ledge portion 104 and the opposed downwardly facing marginal side edge of flexure plate 30. Strip 106 may be formed from rubber or other suitable resilient material to allow flexure plate to be flexed through the maximum expected distance (usually about 0.005 inches) without impairing the accuracy of the equipment.

As viewed from FIGS. 5 and 6, cover plate 92 is disposed on the right-hand side of stands 35 and 36 and spans the space between stands 35 and 36. Cover plate 92 is of the same construction as cover plate 93. In addition the gasketing associated with plate 92 is the same as that just described for plate 93. Accordingly, like reference numerals have been applied to designate like portions of plate 92 and like gasketing and sealing material associated with plate 93.

From the foregoing it will be appreciated that a fluidtight enclosure for load cell 20 is formed by cover plates 92 and 93, baseplate 40, stands 35 and 36, flexure plate 30 gaskets 98, and strips 106. Flexure plate 30, in performing a dual function, defines the top wall of the enclosure and when unflexed will slightly compress strips 106 to ensure a fluidtight seal. The sides of the enclosure are defined by cover plates 92 and 93, the bottom of the enclosure is defined by baseplate 40, and the ends of the enclosure are defined by the upstanding portions of stands 35 and 36.

In some installations, corrosive or other harmful particles, dust, and/or gases may be present in the region of the scale. Under such conditions, clean air or a suitable, noncorrosive, inert gas may be pumped into enclosure 90 through an inlet port 120 (FIGS. 5 and 6). In this fashion enclosure 90 may be pressurized with a gas that excludes substances that may be harmful to load cell 20. If desired, an exhaust port 122 (FIGS. 5 and 6) may be provided so that a continuous flow of clean air or an inert gas through enclosure 90 may be effected by introducing it through inlet port 120 and exhausting it through port 122.

From the foregoing, it is clear that enclosure 90 defines a means whereby the chamber receiving load cell 20 is kept free of dust, corrosive substances, and other undesirable matter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

We claim:

1. A vehicle platform scale comprising a load-receiving platform structure, a plurality of weight-sensing load cells fixed to a stationary surface, means operatively interposed between said platform structure and each of said load cells for transmitting the weight of a load applied to said platform structure to said load cells, and means operatively connected to said load cells to provide a read-out of the weight sensed by said load cells, said weight-transmitting means comprising impact-absorbing resilient means supporting said platform structure and enabling said platform structure to slide horizontally with respect to said load cells under the influence of horizontal force components applied thereto, and further means cooperating with said resilient means to prevent the transmission of horizontal force components to each load cell.

2. The vehicle platform scale defined in claim 1 wherein said resilient means comprises a pad formed from resilient material and having an antifriction platform structure support surface, and means slidably seated on said pad to support said platform structure thereon for the aforesaid horizontal movement.

3. The vehicle platform scale defined in claim 2 comprising means fixing said pad on said further means.

4. The vehicle platform scale defined in claim 3 wherein said platform structure support surface is defined by a layer of antifriction material on said pad.

5. The vehicle platform scale defined in claim 4 wherein said further means comprises a flexure plate having a central portion mounting said pad and being engageable with its associated load cell, and means for anchoring only two end regions of said plate to said stationary surface to enable the load applied to said pad to flex intermediate regions of said plate disposed between said central portion and each of said end regions and thereby vertically displace said central portion.

6. The vehicle platform scale defined in claim 5 wherein said means slidably seated on said pad comprises a further pad positioned on the underside of said platform structure for horizontal movement therewith, said first-named pad and said further pad having their opposed seating surfaces each covered with a layer of antifriction material, with the layer on said first-named pad defining said platform structure support surface.

7. The vehicle platform scale defined in claim 6 wherein the layer of antifriction material on each pad is formed from Teflon.